May 25, 1943.  J. A. CALDWELL  2,319,845
INSTRUMENT CASING
Filed Jan. 15, 1941
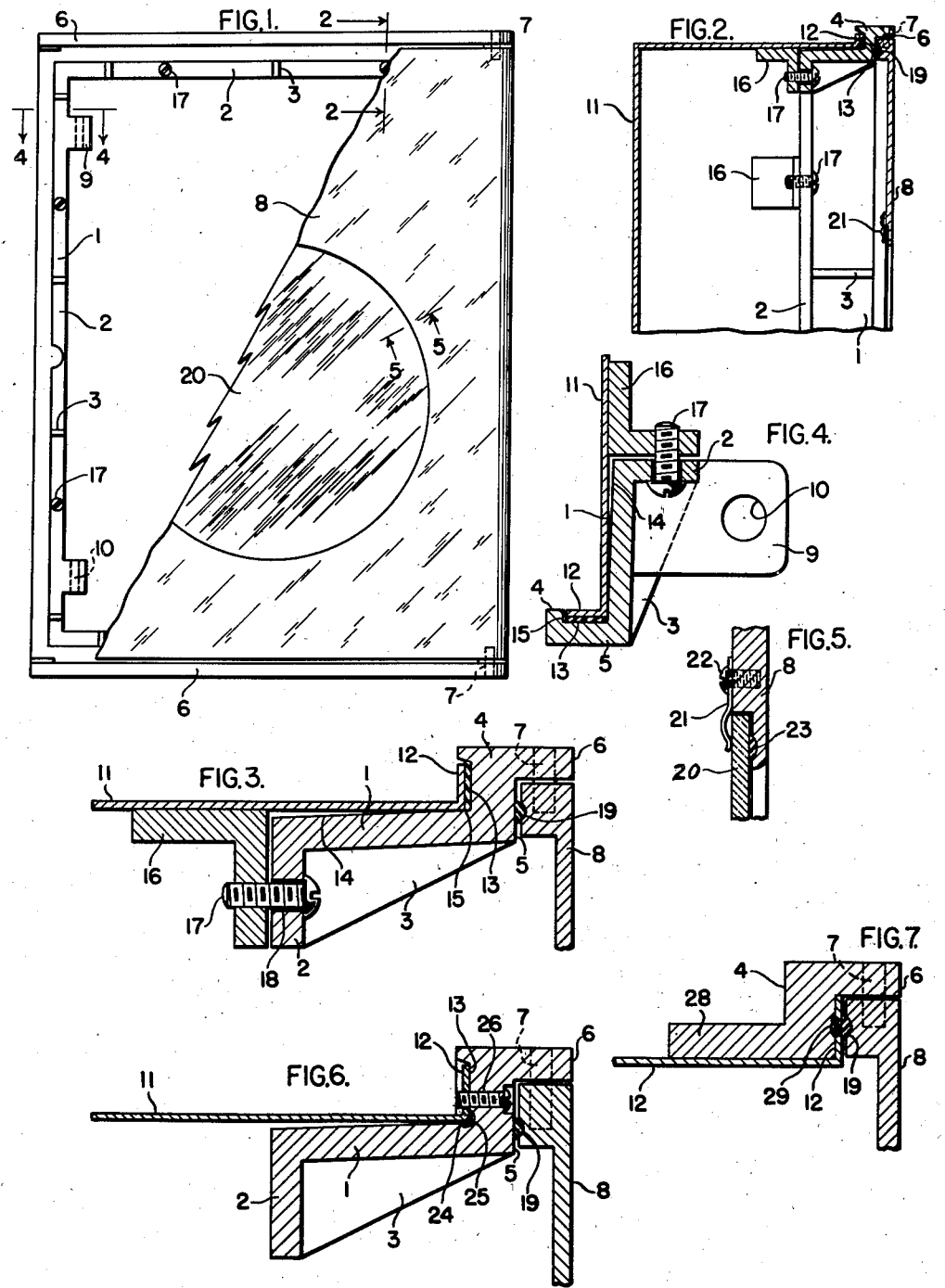
INVENTOR.
JOHN A. CALDWELL
BY C. B. Spangenberg
ATTORNEY Patented May 25, 1943

2,319,845

UNITED STATES PATENT OFFICE 2,319,845

INSTRUMENT CASING

John A. Caldwell, Philadelphia, Pa., assignor to The Brown Instrument Company, Philadelphia, Pa., a corporation of Pennsylvania Application January 15, 1941, Serial No. 374,467

7 Claims. (Cl. 73—151)

The present invention relates to instrument casings and more particularly to an instrument casing which is adapted to be made of several parts that are fastened together in a manner to give the appearance of being a single structural member.

Quite often in the manufacture of measuring instruments it is desirable to have casings which have different depths so that more or less apparatus may be placed in the casing as the need arises. Ordinarily this is not possible since instrument casings are made of castings and therefore they cannot be altered in size without a great deal of trouble and expense. It is an object of the present invention to overcome the objection of having a casing which must always be the same size.

It is an object of the present invention to provide an instrument casing which is light in weight, but which has strength enough to rigidly support all of the mechanism that is placed in the casing. It is a further object of the invention to provide an instrument casing which may be easily changed in size by merely substituting one casing member for another, each of which may be attached to the same frame. It is a further object of the present invention to provide an instrument casing which is dust proof and fume proof so that the delicate measuring mechanism which is enclosed in the casing will not be affected by dirt or any fumes that may be in the surrounding atmosphere. It is a further object of the invention to provide an instrument casing which is inexpensive to manufacture and which is readily adapted for use with all types of measuring instruments.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

Of the drawing—

Fig. 1 is a front view of the instrument casing with a portion of the door broken away, Fig. 2 is a view of the casing taken on line 2—2 of Fig. 1, Fig. 3 is a view of a portion of Fig. 2 on an enlarged scale, Fig. 4 is a view taken on line 4—4 of Fig. 1, Fig. 5 is a view taken on lines 5—5 of Fig. 1, Fig. 6 is a view of a modified form of the invention, and Fig. 7 is a view of another form of the invention.

Referring first to Fig. 1, there is shown a part 1 forming the frame of the casing which is, in this case, rectangular in shape and of a size equal to the desired height and width of the measuring instrument. The frame may either be a casting or may be made up from a series of structural members welded together to form a single part. This frame is formed with an inwardly extending flange 2 provided with reinforcements 3 in the form of ribs extending between the frame 1 and the flange 2. The frame is also provided with an outwardly extending flange 4 that has a flat front face 5. Projecting forwardly from the upper and lower portions of the flange 4 are shoulders 6 that receive hinge pins 7 for a door 8, the details of which will be described below. The frame 1 with its flanges forms a light and very rigid support that is capable of supporting all of the instrument mechanism that is to be placed within the casing.

Since all of the mechanism is supported on the frame 1, there are provided along each side projections 9 upon which the mechanism to be inserted in the casing is mounted. Each of these projections has in it a hole 10 through which pins may be inserted to hold the mechanism in place and to serve as hinge pins if the mechanism is to be swung in and out of the casing, as is quite often the case.

Adapted to be attached to the frame 1 and to form the back and side walls of the casing is a sheet metal casing member 11 which may be made so that the casing has any desired depth. The casing member 11 may be made in one piece if desired, but is preferably made of several pieces bent and fastened together. For example, the top, back and bottom could be one piece of metal and the sides separate pieces fastened thereto. This construction forms a strong and inexpensive casing member. This member 11 has an outwardly extending flange 12 around its front edge which is adapted to be received in a recess 13 formed in the back of the flange 4. The frame 1 is formed with a slightly tapered supporting surface as at 14 in order that the casing member 11 may be easily slipped into place and the flange 12 will be properly aligned with the recess 13. A gasket member 15 made of some material such as rubber, is placed in the recess 13 between the flanges 4 and 12 so that a dust proof joint will be formed between these two flanges. Fastened to the interior of the casing 11 is a series of angle members 16 that are adapted to threadedly receive screws 17 which freely extend through openings 18 in the flange 2. These angle members 16 may be made longer than shown, if desired, so that they, in effect, form a reinforcement around the edges of member 11.

In assembling the parts 1 and 11 of the instrument casing the gasket 15 is first placed in the recess 13 and the member 11 is then placed over the flange 1. After this screws 17 are inserted in place and tightened. This draws parts 1 and 11 closely together so that the casing is in effect a single piece. It is noted that the only exterior joint appears between flanges 4 and 12 and if the instrument casing is flush mounted, as is usually the case, this joint will not be visible. The casing, therefore, to all intents and purposes will be a single piece.

The door 8 is provided around its inner edge with a gasket 19 made of rubber or similar material so that when the door is closed a dust and fume proof joint will also be formed between the door and the casing. It is noted that the flanges 6 extend to the top and bottom edges of the door so that dust which might settle on the upper surfaces will not fall in the casing when the door is open. The door 8 is provided with a window 20 that is held in place by spring clips 21 which are attached by screws 22 to the inner surface of the door around the periphery of the window. These clips serve to hold the glass tightly against a gasket 23 so that there will be a dust proof joint between the glass and the door. Any suitable type of lock may be provided to hold the door closed.

In Fig. 6 there is shown a modification of the invention which differs from that previously described only in the manner in which the casing member 11 is attached to the frame 1. In this embodiment of the invention a groove 24 is formed around the edge of the frame between the horizontal supporting surface 14 and the flange 4. This groove is filled with some suitable calking compound 25 or gasket so that when the member 11 is pulled up against the flange 4 a tight joint will be formed between the two. In this embodiment the flange 4 is provided with an opening through which a screw 26 is passed. This screw is threaded into an opening in the flange 12 and serves to draw the flanges 4 and 12 tightly together. In this construction, as in the construction previously described, there is no joint visible between the two parts except that between the flanges 4 and 12 and this joint cannot be seen if the instrument is flush mounted and is not conspicuous in any case.

A further embodiment of the invention is disclosed in Figure 7. As shown in this figure the frame 28 corresponds to the frame 1 of the proceeding figures except that it does not have the inwardly extending flange 2. In this embodiment the frame 28 is placed over the casing member 11 instead of in it as in the other embodiments that have been described, and the flange 12 falls in front of the flange 4 of the frame. The two flanges 4 and 12 may be fastened together in the manner shown in Figure 6, if desired, or they may be spot welded, as shown at 29. An instrument casing made as shown in Figure 7 may be more suitable for some uses than those shown in the previously described figures since there are no projections on the interior of the casing part 11. Since the flanges 4 and 12 are welded together no gasket is necessary between them, although one may obviously be used if desired.

From the above description it will be seen that I have provided an instrument casing which is rigid and yet light and which casing is capable of protecting any mechanism located therein against contamination by dust, etc., that may be in the atmosphere surrounding the casing. This casing is easily constructed of inexpensive material and may be made in various depths by merely substituting one casing member 11 for another.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described this invention, what I claim as new and desire to secure by Letters Patent is:

1. An instrument casing comprising a rigid supporting frame the shape of the casing, said frame having an outwardly extending flange around it, a formed sheet metal member forming the walls of the casing and having an outwardly extending flange at its edge, said member adapted to be received telescopically by said frame with the outwardly extending flanges adjacent each other, a gasket between said flanges and means to draw said frame and said member together whereby said gasket will be compressed between the flanges.

2. An instrument casing comprising a rigid frame provided with instrument supporting means, said frame being formed on its outside with a supporting surface, one end of the surface terminating in an outwardly extending flange that has a recess in it on the side toward the supporting surface, a member forming the side walls and the back of said casing provided around one edge with an outturned flange, said frame and member being of such a size that the member is received by the supporting surface of the frame with the flange on the member received by the recess of the flange on the frame, mans to seal the joint between the two, and means to rigidly hold the frame and member together.

3. An instrument casing having a hollow frame the shape of the casing, said frame being provided with inwardly and with outwardly projecting flanges extending around the same, a member forming the side walls of the casing, a flange extending outwardly around the edge of said member, the frame and member being of such sizes that the frame is adapted to telescopically receive the member, and means cooperating with the inwardly extending flange of said frame to draw the outwardly extending flanges of the frame and member together.

4. An instrument casing comprising in combination a rigid supporting frame having an outline similar to that of the casing and forming the front opening of the same, said frame having an outwardly extending flange formed thereon, a box-like sheet metal member forming the back and side walls of the casing and being open at the front, an outwardly extending flange around the edge of the open front of said member, said frame being of such a size that it will telescopically receive said member with the upstanding flanges abutting each other, and means joining said flanges together to hold said frame and member in their assembled relation.

5. An instrument casing comprising in combination a rigid frame with an outstanding flange extending around the same, a pair of horizontal parallel ledges extending forwardly from opposite sides of said flange, a box-like member forming the back and sides of said casing and being open at the front, an outwardly extending flange around the edge of said opening, said frame and member being of such size that said member may be received in said frame with said flanges abutting, the flange on said member being in front of the flange on said frame, means to hold said flanges together, and a door for said casing hinged to the ledges on said frame whereby when the door is closed it will engage the flange on said member.

6. In an instrument casing the combination of a rigid rectangular frame member adapted to form the open front of the casing, said frame being formed with a flat front face, a pair of parallel ledges extending from opposite sides of said front face, a box-like member being open at the front forming the sides and back of the casing, said member having an outwardly extending flange around its open front, said frame and member being of such size that said frame can receive said member with the flange of said member lying against the front face of said frame, means to hold said face in assembled relation with the flange on said member extending in front of said face, a door for said casing fitted between said ledges and having a face adapted to engage the front of the flange on said member, a gasket attached to the face of said door to cooperate with said flange and means to hinge said door to said ledges.

7. In an instrument casing the combination of a rigid rectangular frame member adapted to form the open front of the casing, said frame being formed with a flat face, a pair of parallel ledges extending from opposite sides of said frame, a box-like member being open at the front forming the sides and back of the casing, said member having an out-wardly extending flange around its open front, said frame and member being of such size that said frame can receive said member with the flange of said member lying against the face of said frame, means to hold said face in assembled relation with the flange on said member lying against said face, a door for said casing fitted between said ledges and having a face adapted to close the opening of said member, a gasket attached to the face of said door and means to hinge said door to said ledges.

JOHN A. CALDWELL.